(12) United States Patent
Hou et al.

(10) Patent No.: US 12,086,395 B2
(45) Date of Patent: Sep. 10, 2024

(54) DEVICE CONTROL METHOD, STORAGE MEDIUM, AND NON-TRANSITORY COMPUTER-READABLE ELECTRONIC DEVICE

(71) Applicant: GUANGDONG OPPO MOBILE TELECOMMUNICATIONS CORP., LTD., Guangdong (CN)

(72) Inventors: Yihan Hou, Guangdong (CN); Hualong Zhang, Guangdong (CN); Junjun Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/991,403

(22) Filed: Nov. 21, 2022

(65) Prior Publication Data

US 2023/0091771 A1 Mar. 23, 2023

Related U.S. Application Data

(63) Continuation of application No. PCT/CN2021/084686, filed on Mar. 31, 2021.

(30) Foreign Application Priority Data

May 22, 2020 (CN) .......................... 202010444015.2

(51) Int. Cl.
*G06F 3/04845* (2022.01)
*G06F 3/04842* (2022.01)
*G06F 3/0485* (2022.01)

(52) U.S. Cl.
CPC ...... *G06F 3/04845* (2013.01); *G06F 3/04842* (2013.01); *G06F 3/0485* (2013.01)

(58) Field of Classification Search
CPC .... G06F 3/0488; G06F 3/04883; G06F 3/017; G06F 3/04817; G06F 3/0485;
(Continued)

(56) References Cited

U.S. PATENT DOCUMENTS 9,898,183 B1 2/2018 Zhou
2009/0135152 A1\* 5/2009 Lii ...................... G06F 3/04883
345/173

(Continued)

FOREIGN PATENT DOCUMENTS

CN 102855073 A 1/2013
CN 103635873 A 3/2014
(Continued)

OTHER PUBLICATIONS

International search report and Written Opinion with English Translation of the International Search Authority International Application No. PCT/CN2021/084686 mailed Jun. 29, 2021 (14 pages).

(Continued)

*Primary Examiner* — Dong Hui Liang
(74) *Attorney, Agent, or Firm* — Young Basile Hanlon & MacFarlane, P.C.

(57) ABSTRACT

A device control method, a non-transitory computer-readable storage medium, and an electronic device are provided. The method includes: determining a target region in a touch display screen; displaying, in the target region, the first display content subject to a zoom-out process, the target region being a region that is accessible in a single-hand operation mode; obtaining, in response to monitoring an event of switching from receiving a continuous touch operation to exiting the touch operation in the target region, a first touch position corresponding to the last touch operation before exiting the touch operation, the continuous touch operation being a touch operation having a continuous touch (Continued)

trajectory; and performing a simulated click action on a content displayed at the first touch position corresponding to the last touch operation.

20 Claims, 11 Drawing Sheets

(58) Field of Classification Search
CPC .. G06F 3/04886; G06F 3/0482; G06F 3/0484; G06F 3/04845; G06F 3/04847; G06F 3/041; G06F 3/016; G06F 3/048; G06F 2203/04806; G06F 2203/04808; G06F 1/163

See application file for complete search history.

(56) References Cited

U.S. PATENT DOCUMENTS

| | | | |
|---|---|---|---|
| 2013/0285933 A1* | 10/2013 | Sim | G06F 3/04883 345/173 |
| 2015/0084893 A1 | 3/2015 | Amagai | |
| 2015/0234581 A1* | 8/2015 | Terrero | G06F 3/04847 715/863 |
| 2015/0378545 A1* | 12/2015 | Telang | G09G 5/34 715/825 |
| 2016/0092060 A1 | 3/2016 | Landau et al. | |
| 2016/0216869 A1* | 7/2016 | Yan | G06F 3/04845 |
| 2016/0224221 A1* | 8/2016 | Liu | G06F 3/04845 |
| 2016/0349985 A1* | 12/2016 | Ibaraki | G06F 3/04883 |
| 2019/0227689 A1 | 7/2019 | Wei et al. | |
| 2020/0125177 A1 | 4/2020 | Li et al. | |
| 2023/0205417 A1* | 6/2023 | Yang | G06F 3/04886 715/764 |

FOREIGN PATENT DOCUMENTS

| | | |
|---|---|---|
| CN | 107562353 A | 1/2018 |
| CN | 109375864 A | 2/2019 |
| CN | 110908563 A | 3/2020 |
| CN | 111061409 A | 4/2020 |
| CN | 111078086 A | 4/2020 |
| CN | 111078087 A | 4/2020 |
| CN | 111625176 A | 9/2020 |
| WO | 2015199175 A1 | 12/2015 |

OTHER PUBLICATIONS

Chinese First Office Action with English Translation Application for CN Appl No. 202010444015.2, mailed Mar. 22, 2021 (19 pages).
Chinese Second Office Action with English Translation Application for CN Appl No. 202010444015.2, mailed Aug. 17, 2021 (14 pages).
Chinese Rejection Decision with English Translation Application for CN Appl No. 202010444015.2 mailed Jan. 12, 2022 (12 pages).
Extended European Search Report for EP Application 21807733.7 mailed Oct. 19, 2023. (9 pages).

* cited by examiner

```
┌─────────────────────────────────────────────────────────────┐
│ receiving, by the electronic device, the trigger instruction │
│ by the touch display screen, the trigger instruction being   │──201
│ a triggering touch operation                                  │
└─────────────────────────────────────────────────────────────┘
                              │
                              ▼
┌─────────────────────────────────────────────────────────────┐
│ in response to the touch position corresponding to the       │
│ triggering touch operation received by the touch display     │
│ screen being located in a side display region of the touch   │
│ display screen, the corresponding touch direction being the  │──202
│ preset direction, and the length of the corresponding touch  │
│ trajectory reaching the preset threshold, performing the     │
│ zoom-out process on the first display content on the touch   │
│ display screen                                                │
└─────────────────────────────────────────────────────────────┘
                              │
                              ▼
┌─────────────────────────────────────────────────────────────┐
│ in response to receiving, by the right-side display region of│
│ the touch display screen, the triggering touch operation     │
│ meeting the preset condition, determining, by the electronic │
│ device, a region with a preset size at the lower-right side  │
│ of the touch display screen as the target region; and in     │──203
│ response to receiving, by the left-side display region of the│
│ touch display screen, the triggering touch operation meeting │
│ the preset condition, determining, by the electronic device, │
│ a region with a preset size at the lower-left side of the    │
│ touch display screen as the target region, the target region │
│ being a region that is accessible in the single-hand         │
│ operation mode                                                │
└─────────────────────────────────────────────────────────────┘
                              │
                              ▼
┌─────────────────────────────────────────────────────────────┐
│ displaying, by the electronic device, the first display      │──204
│ content subject to the zoom-out process in the target region │
└─────────────────────────────────────────────────────────────┘
                              │
                              ▼
┌─────────────────────────────────────────────────────────────┐
│ in response to monitoring the event of switching from        │
│ receiving the continuous touch operation to exiting the touch│
│ operation in the target region, obtaining, by the electronic │──205
│ apparatus, the touch position corresponding to the last touch│
│ operation before exiting the touch operation, the touch      │
│ operation corresponding to the trigger instruction and the   │
│ touch operation received in the target region have a         │
│ continuous touch trajectory                                   │
└─────────────────────────────────────────────────────────────┘
                              │                              ,206
                              ▼
┌─────────────────────────────────────────────────────────────┐
│ performing, by the electronic device, the simulated click    │
│ action on the content displayed at the touch position        │
│ corresponding to the last touch operation                    │
└─────────────────────────────────────────────────────────────┘
                              │
                              ▼
┌─────────────────────────────────────────────────────────────┐
│ displaying, by the electronic device, the interface after the│──207
│ simulated click action with an initial region, the initial   │
│ region being a region occupied by the first display content  │
│ before the zoom-out process                                   │
└─────────────────────────────────────────────────────────────┘
```

Fig. 6

DEVICE CONTROL METHOD, STORAGE MEDIUM, AND NON-TRANSITORY COMPUTER-READABLE ELECTRONIC DEVICE

CROSS-REFERENCE TO RELATED APPLICATION(S)

The present disclosure is a continuation-application of International (PCT) Patent Application No. PCT/CN/2021/084686 filed on Mar. 31, 2021, which claims the priority of Chinese patent application No. 202010444015.2, filed on May 22, 2020, the entire contents of both of which are incorporated herein by reference.

TECHNICAL FIELD

The present disclosure relates to the technical field of electronic devices, in particular to a device control method, a non-transitory computer-readable storage medium, and an electronic device.

BACKGROUND

With continuous development of the technology, forms or appearances of electronic devices also keep varying. Screens of the electronic devices have evolved from small-sized screens to large-sized screens, and from screens configured solely for displaying images and texts to touch display screens that could receive touch operations from users, and so on.

SUMMARY

Embodiments of the present disclosure provides a device control method, a non-transitory computer-readable storage medium, and an electronic device, which may improve diversity of operating ways of the electronic device in a single-hand operation mode.

According to a first aspect of the present disclosure, a device control method applied to an electronic device including a touch display screen is provided according to some embodiments. The method may include: performing a zoom-out process on a first display content on the touch display screen; determining a target region on the touch display screen, and displaying, in the target region, the first display content subject to the zoom-out process, the target region being a region that is accessible in the single-hand operation mode; obtaining, in response to monitoring an event of switching from receiving a continuous touch operation to exiting the touch operation in the target region, a first touch position corresponding to the last touch operation before exiting the touch operation, the continuous touch operation being a touch operation having a continuous touch trajectory; and performing a simulated click action on a content displayed at the first touch position corresponding to the last touch operation.

According to a second aspect of the present disclosure, a storage medium is provided according to some embodiments. A computer program may be stored on the storage medium. When being executed on a computer, the computer program may enable the computer to implement the device control method provided in the embodiments of the present disclosure.

According to a third aspect of the present disclosure, an electronic device including a memory, a processor, and a touch display screen is further provided according to some embodiments. The processor may be configured to perform the device control method provided in the embodiments of the present disclosure by calling a computer program stored in the memory.

BRIEF DESCRIPTION OF DRAWINGS

The technical solution of the present disclosure and the effects thereof will be made apparent by the detailed description of specific embodiments of the present disclosure in conjunction with drawings illustrated below.

FIG. 6 is another schematic flow chart of a device control method according to other embodiments of the present disclosure.

DETAILED DESCRIPTION

Figure 1:
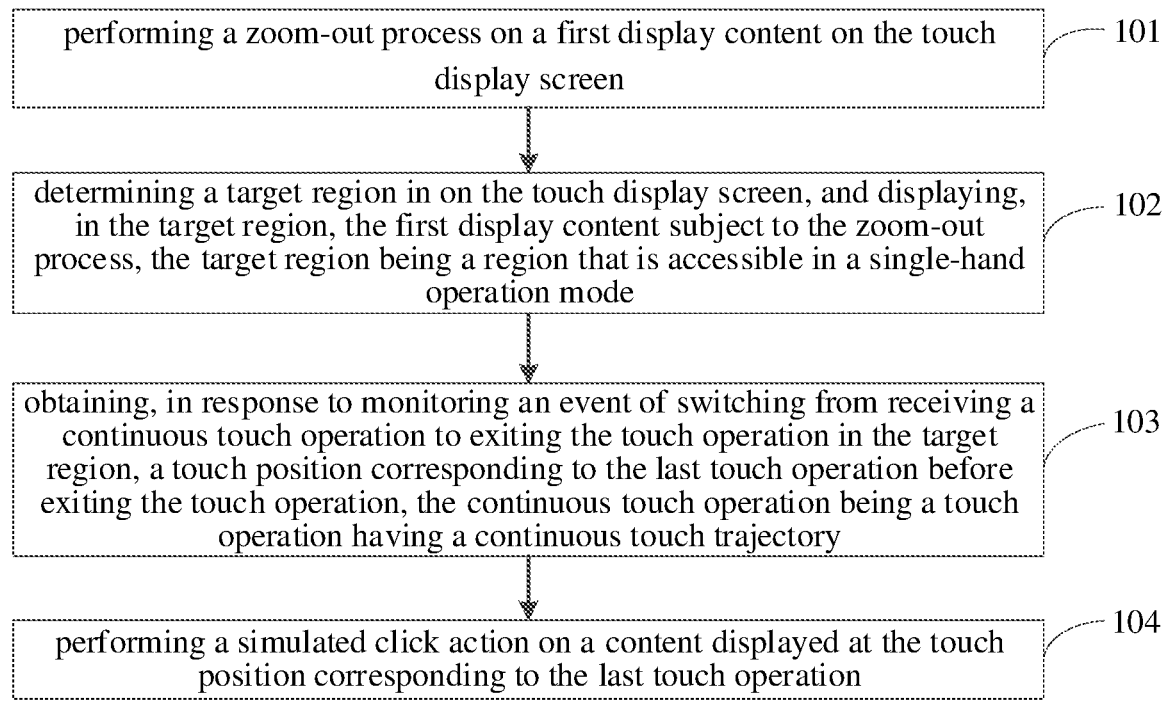
FIG. 1 is a schematic flow chart of a device control method according to some embodiments of the present disclosure.

As shown in the drawings, the same reference number represents the same component. The principle of the present disclosure is illustrated by an example implemented in an appropriate computing environment. The following description is based on the illustrated specific embodiments of the present disclosure, and should not be considered as limiting other specific embodiments of the present disclosure not detailed herein.

It should be appreciated that, a performing subject of some embodiments of the present disclosure may be an electronic device such as a smartphone, a tablet computer, or the like.

A device control method applied to the electronic device is provided according to some embodiments of the present disclosure. The electronic device includes a touch display screen. The method includes: performing a zoom-out process or a scale-down process on a first display content on the touch display screen; determining a target region on the touch display screen, and displaying, in the target region, the first display content subject to the zoom-out process, the target region being a region that is accessible or reachable in a single-hand operation mode; obtaining, in response to monitoring an event of switching from receiving a continuous touch operation to exiting or quitting the touch operation in the target region, a first touch position corresponding to the last touch operation before exiting the touch operation, the continuous touch operation being a touch operation having a continuous touch trajectory; and performing a simulated click action on a content displayed at the first touch position corresponding to the last touch operation.

In some embodiments, the method further includes: displaying an interface after the simulated click action with an initial display region. The initial display region is a region occupied by the first display content before the zoom-out process.

In some embodiments, the method further includes: displaying, in response to a content displayed on an interface being triggered to change by the simulated click action, a second display content after the simulated click action with an initial display region. The initial display region is a region occupied by the first display content before the zoom-out process.

In some embodiments, the method further includes: receiving a trigger instruction. The performing the zoom-out process on the first display content on the touch display screen includes: in response to the received trigger instruction meeting a preset condition, performing the zoom-out process on the first display content on the touch display screen.

In some embodiments of the present disclosure, the receiving the trigger instruction includes: receiving a triggering touch operation through the touch display screen. The received trigger instruction meeting the preset condition includes: a touch parameter corresponding to the triggering touch operation received by the touch display screen meeting the preset condition.

In some embodiments of the present disclosure, the touch parameter corresponding to the triggering touch operation received by the touch display screen meeting the preset condition includes: a second touch position corresponding to the triggering touch operation received by the touch display screen being located in a side display region of the touch display screen, and a corresponding touch direction being a preset direction.

In some embodiments of the present disclosure, the touch parameter corresponding to the triggering touch operation received by the touch display screen meeting the preset condition includes: a second touch position corresponding to the triggering touch operation received by the touch display screen being located in the side display region of the touch display screen, the corresponding touch direction being the preset direction, and a length of a corresponding touch trajectory reaching a preset threshold.

In some embodiments of the present disclosure, the operation of determining the target region on the touch display screen includes: in response to receiving, by a right-side display region of the touch display screen, the triggering touch operation meeting the preset condition, determining a region with a preset size at a lower-right side of the touch display screen as the target region; and in response to receiving, by a left-side display region of the touch display screen, the triggering touch operation meeting the preset condition, determining the region with the preset size at a lower-left side of the touch display screen as the target region.

In some embodiments of the present disclosure, the triggering touch operation corresponding to the trigger instruction and the touch operation received in the target region have a continuous touch trajectory.

In some embodiments, the method further comprises: displaying, in response to not triggering a content displayed on an interface to change by the simulated click action, the first display content which is subjected to the zoom-out process in the target region continuously.

As shown in FIG. 1, FIG. 1 is a schematic flow chart of a device control method according to some embodiments of the present disclosure. The device control method may be applied to an electronic device. The electronic device may include a touch display screen. The device control method may include operations at blocks illustrated in FIG. 1.

At block 101, performing a shrinking process, a zoom-out process, or a scale-down process on a first display content on the touch display screen.

With continuous development of the technology, the form or appearance of the electronic device also keeps varying. For example, a small-sized screen evolves to a large-sized screen, a display screen configured solely for displaying images and texts evolves to a touch display screen that may receive a touch operation from a user. However, in the related art, when the electronic device with the large-sized screen is operated by the user with a single hand, operation manners of the electronic device are not diverse enough.

In some embodiments of the present disclosure, the electronic device may first perform the zoom-out process on the content currently displayed on the touch display screen. The content currently displayed on the touch display screen is the first display content.

At block 102, determining a target region on the touch display screen, and displaying, in the target region, the first display content performed with or subject to the zoom-out process. The target region is a region that is accessible or touchable in the single-hand operation mode.

For example, the electronic device may also determine or identify the target region on the touch display screen. When the electronic device is in the single-hand operation mode, the target region may be a region of the touch display screen that is accessible to a finger of the single hand of the user operating the device. After the target region has been determined, the electronic device may display, in the target region, the above-mentioned first display content subject to the zoom-out process.

Figure 2:
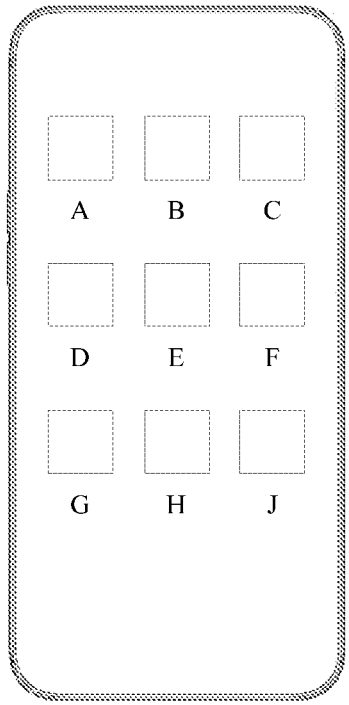
FIG. 2 is a schematic diagram illustrating a scenario of the device control method according to some embodiments of the present disclosure.
Figure 3:
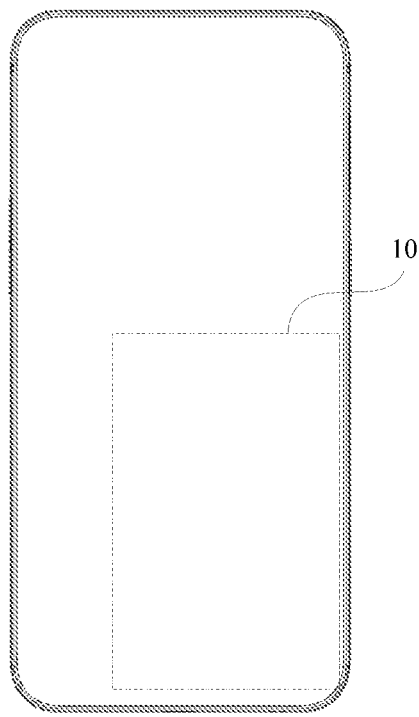
FIG. 3 is a schematic diagram illustrating a scenario of the device control method according to some embodiments of the present disclosure.
Figure 4:
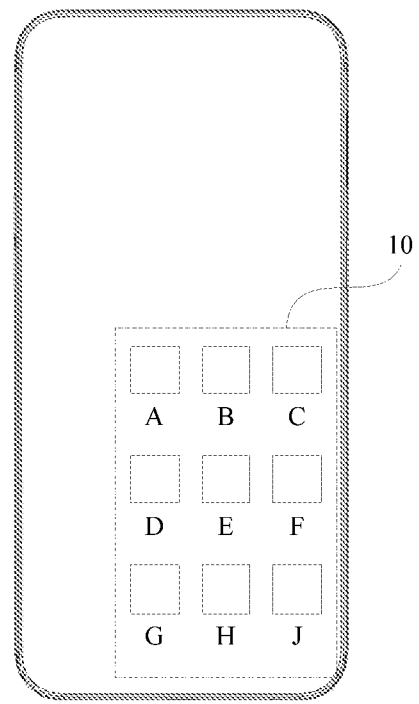
FIG. 4 is a schematic diagram illustrating a scenario of the device control method according to some embodiments of the present disclosure.

For example, the touch display screen is currently displaying a desktop of the electronic device. That is, the first display content is the desktop of the electronic device. For example, as shown in FIG. 2, icons and names for applications A, B, C, D, E, F, G, H, and J are included on the desktop. In this case, in the operation at block 101, the electronic device may perform the zoom-out process on the icons of the applications A, B, C, D, E, F, G, H, J and texts corresponding to the names of applications A, B, C, D, E, F, G, H, and J. The electronic device may determine a region in a lower-right corner of the touch display screen as the target region. For example, the target region may be a region 10 as shown in FIG. 3. After the target region is determined, as shown in FIG. 4, the electronic device may display the first display content subject to the zoom-out process in the target region 10.

It should be appreciated that, since the target region is a region that is accessible to the finger of the single hand of the user operating the device when the electronic device is in the single-hand operation mode, the content displayed in the target region may also be accessed or touched by the finger of the single hand of the user operating the device.

Of course, in some other embodiments, the target region determined by the electronic device may also be other regions, such as a region in a lower-left corner of the touch display screen, and the like.

In some embodiments, the operation of performing the zoom-out process on the first display content on the touch display screen may precede or performed before the operation of determining the target region on the touch display screen. In some embodiments, the operation of performing the zoom-out process on the first display content on the touch display screen may be performed after the operation of determining the target region on the touch display screen. In some embodiments, the two operations may be performed in parallel.

At block 103, in response to monitoring or detecting an event of switching from receiving a continuous touch operation to exiting the touch operation in the target region, obtaining a first touch position corresponding to the last touch operation before exiting or quitting the touch operation. The continuous touch operation is a touch operation having a continuous touch trajectory or touch trace.

At block 104, performing a simulated click action on the content displayed at the first touch position corresponding to the last touch operation.

For example, the operations at blocks 103 and 104 may include the following operations.

After displaying the first display content subject to the zoom-out process in the target region, the electronic device may detect whether the event of switching from receiving the continuous touch operation to exiting the touch operation is monitored in the target region. The continuous touch operation monitored by the electronic device in the target region may have a continuous touch trajectory. It should be noticed that, the event of switching from receiving the continuous touch operation to exiting the touch operation may refer to an event of switching from a continuous touch operation by the user's finger on the display screen to leaving or removing of the user's finger from the touch display screen. In other words, when the user's finger performs the touch operation with a continuous touch trajectory on the display screen, the display screen is capable of receiving the touch operation. While the user's finger leaves the display screen, the display screen is no longer able to receive the touch operation. Therefore, from the perspective of the display screen, this event is the event of switching from receiving the continuous touch operation to exiting the touch operation. That is, in some embodiments of the present disclosure, the event of switching from receiving the continuous touch operation to exiting the touch operation monitored in the target region may refer to such an event monitored by the electronic device in the target region, that the user's finger leaves the display screen after a continuous touch on the display screen.

When the event of switching from receiving the continuous touch operation to exiting the touch operation is not monitored in the target region, i.e., the electronic device fails to monitor or detect the event in the target region that the user's finger leaves the display screen after continuously touching the display screen, then the electronic device may perform other operations. For example, the electronic device may continue to detect whether the event of switching from receiving the continuous touch operation to exiting the touch operation is monitored in the target region, or the like.

When the event of switching from receiving the continuous touch operation to exiting the touch operation is monitored in the target region, i.e., the electronic device monitors the event in the target region that, the user's finger leaves the display screen after continuously touching the display screen, then the electronic device may obtain the first touch position corresponding to the last touch operation before exiting the touch operation, and perform the simulated click action on the content displayed at this first touch position corresponding to the last touch operation. It should be noted that, the simulated click action performed on the content displayed at this touch position may be equivalent to the operation of the user's finger tapping or clicking on the content displayed at this touch position.

Figure 5:
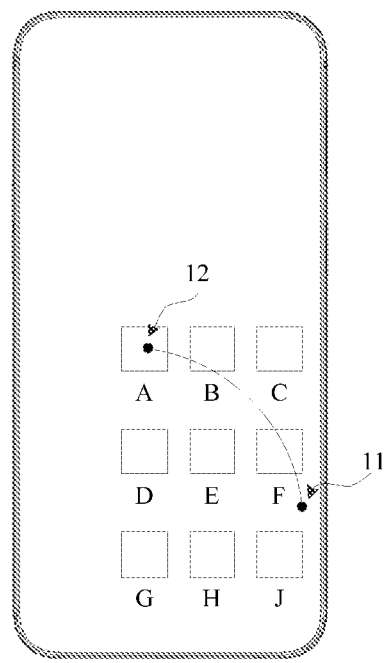
FIG. 5 is a schematic diagram illustrating a scenario of the device control method according to some embodiments of the present disclosure.

For example, as shown in FIG. 5, when the user's finger slides continuously from a first position 11 to a second position 12 in the target region, and then leaves the display screen (e.g., the finger is lifted by the user and thus no longer touches the display screen of the electronic device), then the electronic device may monitor the event of switching from receiving the continuous touch operation to exiting the touch operation in the target region. At this time, the electronic device may obtain the first touch position corresponding to the last touch operation before exiting the touch operation. For example, the first touch position corresponding to the last touch operation obtained by the electronic device is the second position 12. The electronic device may perform the simulated click action on the content displayed at the second position 12. For example, since the second position 12 is a position where the icon of the application A is located, thus the simulated click action performed on the second position 12 is equivalent to an action of the user's finger tapping on the second position 12. For example, since the electronic device may launch the application A when the user's finger taps on the second position 12, thus the simulated click action performed on the second position 12 also enables the launch of the application A.

It should be appreciated that, in some embodiments of the present disclosure, the electronic device may perform the zoom-out process on the first display content on the touch display screen. The first display content subject to the zoom-out process will be displayed in the target region. When the electronic device is in the single-hand operation mode, the target region is a region that is accessible to the finger of the user operating the device. When the event that the user's finger leaves the display screen after continuously touching the display screen is monitored in the target region, the electronic device may obtain the first touch position corresponding to the last touch operation, and perform the simulated click action on the content displayed at the first touch position corresponding to the last touch operation. Thus, the embodiments of the present disclosure provide a new way of operating the electronic device with a single hand. That is, the embodiments of the present disclosure may increase the diversity of operating manners of the electronic device in the single-hand operation mode.

As shown in FIG. 6, FIG. 6 is another flow diagram of a device control method according to some embodiments of the present disclosure. The device control method may be applied to the electronic device. The electronic device may include the touch display screen. The device control method may include operations at blocks illustrated in FIG. 6.

At block 201, receiving, by the electronic device, a trigger instruction via the touch display screen. The trigger instruction is a triggering touch operation.

For example, the electronic device may first receive a triggering touch operation through the touch display screen. This triggering touch operation may be a touch operation used or configured as a trigger instruction.

After the touch display screen receives the triggering touch operation, the electronic device may detect whether a touch parameter corresponding to the triggering touch operation meets a preset condition.

In some embodiments, the touch parameter corresponding to the triggering touch operation and received by the above touch display screen meeting the preset condition may include: a second touch position corresponding to the triggering touch operation received by the touch display screen being located in a side display region of the touch display screen, a corresponding touch direction being a preset direction, and a length of the corresponding touch trajectory reaching a preset threshold.

In other words, when the second touch position corresponding to the triggering touch operation received by the touch display screen and used as the trigger instruction is located in the side display region of the touch display screen, the touch direction corresponding to the triggering touch operation is the preset direction, and the length of the touch trajectory corresponding to the triggering touch operation reaches the preset threshold, then it may be determined that, the touch parameter corresponding to the triggering touch operation meets the preset condition. Otherwise, it may be considered that, the touch parameter corresponding to the touch operation does not or fails to meet the preset condition.

When it is detected that, the touch parameter corresponding to the triggering touch operation received by the touch display screen meets the preset condition, then an operation at block 202 may be performed.

When it is detected that, the touch parameter corresponding to the triggering touch operation received by the touch display screen does not meet the preset condition, then the electronic device may perform other operations.

At block 202, in response to the second touch position corresponding to the triggering touch operation received by the touch display screen being located in the side display region of the touch display screen, the corresponding touch direction being the preset direction, and the length of the corresponding touch trajectory reaching the preset threshold, performing, by the electronic device, the zoom-out process on the first display content on the touch display screen.

For example, the second touch position corresponding to the triggering touch operation and received by the electronic device through the touch display screen is located in the side display region of the touch display screen, the touch direction corresponding to the triggering touch operation is the preset direction, and the length of the touch trajectory corresponding to the triggering touch operation reaches the preset threshold, then the electronic device may determine that, the user needs to carry out the single-hand operation. At this time, the electronic device may perform the zoom-out process on the first display content. The first display content is the content currently displayed on the touch display screen.

It should be appreciated that, in the present embodiment, the zoom-out process performed by the electronic device on the first display content on the touch display screen may only be triggered when it is detected that: the second touch position corresponding to the triggering touch operation received by the touch display screen is located in the side display region of the touch display screen, the corresponding touch direction is the preset direction, and the length of the corresponding touch trajectory reaches the preset threshold. In this way, it is possible to reduce the occurrence of the user's false trigger operation, and it may be ensured that, the electronic device may receive an accurate trigger instruction for entering the single-hand operation mode.

Of course, in some other embodiments, the following technical scheme may also be employed: when the second touch position corresponding to the triggering touch operation received by the touch display screen is located in the side display region of the touch display screen, and the corresponding touch direction is the preset direction, then the electronic device may perform the zoom-out process on the first display content on the touch display screen.

In addition, in some embodiments, the triggering touch operation corresponding to the trigger instruction may also be other kinds of touch operations, such as a sliding-down operation, a two-finger pinching operation, a two-finger tapping operation, a single-finger double-tapping operation, etc. in any region of the screen, which are not limited in the present disclosure.

At block 203, in response to receiving, by a right-side display region of the touch display screen, the triggering touch operation meeting the preset condition, determining, by the electronic device, a region with a preset size at a lower-right side of the touch display screen as the target region; in response to receiving, by a left-side display region at a left side of the touch display screen, the triggering touch operation meeting the preset condition, determining, by the electronic device, a region with a preset size at a lower-left side of the touch display screen as the target region. The target region is a region that is accessible in the single-hand operation mode.

For example, after receiving the triggering touch operation with the touch parameter that meets the preset condition, the electronic device may detect whether the triggering touch operation was received in the right-side display region or in the left-side display region of the touch display screen.

When it is detected that, the triggering touch operation with the touch parameter that meets the preset condition is received in the right-side display region of the touch display screen, then the electronic device may determine the region with the preset size at the lower-right side of the touch display screen as the target region. The target region may be a region that is accessible to the finger of the user when the device is operated by a single hand.

It should be appreciated that, when the triggering touch operation with the touch parameter that meets the preset condition is received in the right-side display region of the touch display screen, then the user may be considered to operate the electronic device with the single right hand, and therefore the electronic device may determine the region with the preset size at the lower-right side of the touch display screen as the target region. The target region is the region that is accessible to the user's right thumb. For example, at this time, the target region may be the region 10 as shown in FIG. 3. The region 10 is a region with the preset size. The region 10 is at the lower-right corner of the touch display screen.

When it is detected that, the triggering touch operation with the touch parameter that meets the preset condition is received in the left-side display region of the touch display screen, then the electronic device may determine the region with the preset size at the lower-left side of the touch display screen as the target region. The target region may be a region that is accessible to the finger of the user when the device is operated by a single hand.

Figure 7:
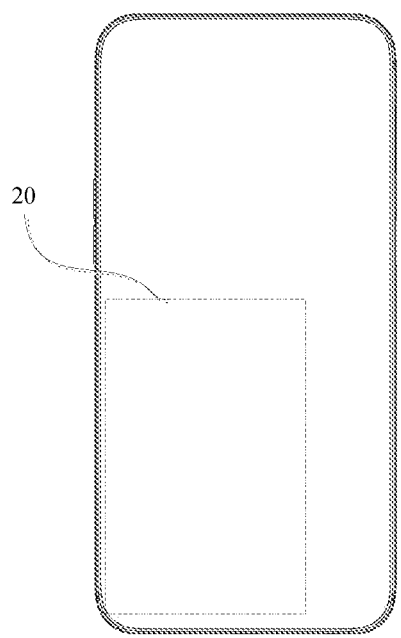
FIG. 7 is a schematic diagram illustrating another scenario of the device control method according to some embodiments of the present disclosure.

It should be appreciated that, when the triggering touch operation with the touch parameter that meets the preset condition is received in the left-side display region of the touch display screen, then the user may be considered to operate the electronic device with the single left hand, and therefore the electronic device may determine the region with the preset size at the lower-left side of the touch display screen as the target region. The target region is the region that is accessible to the user's left thumb. For example, at this time, the target region may be the region 20 as shown in FIG. 7. The region 20 is a region with a preset size. The region 20 is at the lower-left corner of the touch display screen.

In some embodiments, the left-side display region and the right-side display region of the touch display screen may be defined and set in advance. The location, size or the like of the left-side display region and the right-side display region may be preset.

At block 204, displaying, by the electronic device, the first display content subject to the zoom-out process in the target region.

For example, after the target region has been determined on the touch display screen, the electronic device may display, in the target region, the first display content subject to the zoom-out process.

For example, the touch display screen is currently displaying the desktop of the electronic device. For example, the icons and names for applications A, B, C, D, E, F, G, H, and J are included on the desktop. The target region may be the region 10 as shown in FIG. 3. Then as shown in FIG. 4, the electronic device may perform the zoom-out process on the icons of the applications A, B, C, D, E, F, G, H, J and the texts corresponding to the names of the applications A, B, C, D, E, F, G, H and J. The electronic device may display the first display content subject to the zoom-out process in the target region 10.

At block 205, in response to monitoring the event of switching from receiving the continuous touch operation to exiting the touch operation in the target region, obtaining, by the electronic device, the first touch position corresponding to the last touch operation before exiting the touch operation. The triggering touch operation corresponding to the trigger instruction and the touch operation received in the target region have a continuous touch trajectory. That is, in some embodiments, the triggering touch operation may form a part of the continuous touch operation.

At block 206, performing, by the electronic device, the simulated click action on the content displayed at the first touch position corresponding to the last touch operation.

For example, the operations at blocks 205 and 206 may include the following operations.

After displaying the first display content subject to the zoom-out process in the target region, the electronic device may detect whether the event of switching from receiving the continuous touch operation to exiting the touch operation is monitored in the target region. The continuous touch operation monitored by the electronic device in the target region may have a continuous touch trajectory. It should be noticed that, the event of switching from receiving the continuous touch operation to exiting the touch operation may refer to an event of switching from the continuous touch operation by the user's finger on the display screen to leaving or removing of the user's finger from the touch display screen. In other words, when the user's finger performs the touch operation with a continuous touch trajectory on the display screen, the display screen is capable of receiving the touch operation. While the user's finger leaves the display screen, the display screen is no longer able to receive the touch operation. Therefore, from the perspective of the display screen, this event is the event of switching from receiving the continuous touch operation to exiting the touch operation. That is, in some embodiments of the present disclosure, the event of switching from receiving the continuous touch operation to exiting the touch operation monitored in the target region may refer to such an event monitored by the electronic device in the target region, that the user's finger leaves the display screen after a continuous touch on the display screen.

When the event of switching from receiving the continuous touch operation to exiting the touch operation is not monitored in the target region, i.e., the electronic device does not or fails to monitor or detect the event of the user's finger leaving the display screen after continuously touching the display screen in the target region, then the electronic device may perform other operations. For example, the electronic device continues to detect whether the event of switching from receiving the continuous touch operation to exiting the touch operation is monitored in the target region, and the like.

When the event of switching from receiving the continuous touch operation to exiting the touch operation is monitored in the target region, i.e., the electronic device monitors the event of the user's finger leaving the display screen after continuously touching the display screen in the target region, then the electronic device may obtain the first touch position corresponding to the last touch operation before exiting the touch operation, and perform the simulated click action on the content displayed at the first touch position corresponding to the last touch operation. It should be noted that, the simulated click action performed on the content displayed at the first touch position corresponding to the last touch operation may be equivalent to the operation of the user's finger tapping on the content displayed at this touch position.

In some embodiments of the present disclosure, the touch operation corresponding to the trigger instruction in the operation at block 201 and the continuous touch operation received in the target region in the operation at block 205 have a continuous touch trajectory.

Figure 8:
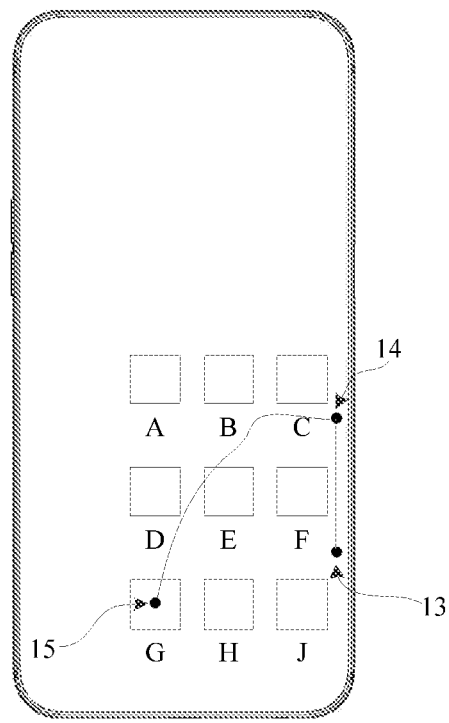
FIG. 8 is a schematic diagram illustrating the another scenario of the device control method according to some embodiments of the present disclosure.

For example, the user's thumb performs an upward swiping operation or an upward sliding operation in the right-side display region of the touch display screen. For example, as shown in FIG. 8, the user's thumb slides upward from a third position 13 (the black dot position indicated by an arrow in the figure) to a fourth position 14 (the black dot position indicated by an arrow in the figure). A length of a sliding trajectory between the third position 13 and the fourth position 14 is greater than the preset threshold. Then, the user's triggering touch operation may be considered to meet the preset condition. At this time, the electronic device may determine that, the user needs to perform a single right-hand operation.

In the single right-hand operation mode, the electronic device may determine the region with the preset size in the lower-right corner of the touch display screen as the target region. After that, the electronic device may perform the zoom-out process on the first display content currently displayed on the touch display screen, and as shown in FIG. 8, display the first display content subject to the zoom-out process in the target region.

For example, after sliding upward from the third position 13 to the fourth position 14, the user's thumb continues to slide to a fifth position 15 (the black dot position indicated by an arrow in the figure). As shown in FIG. 8, a sliding trajectory from the third position 13 to the fifth position 15 through the fourth position 14 is continuous and uninterrupted.

After the thumb slides to the fifth position 15, the user lifts the thumb, such that the user's thumb no longer touches the touch display screen any more. In this case, the electronic device may obtain the first touch position corresponding to the last touch operation. In other words, the electronic device may obtain the fifth position 15. After obtaining the fifth position 15, the electronic device may perform the simulated click action on the content displayed at the fifth position 15. For example, since the fifth position 15 is the position where the icon of the application G is located, thus the simulated click action on the fifth position 15 is equivalent to an action of the user's finger tapping on the fifth position 15. For example, since the electronic device may launch the application G when the user's finger taps on the fifth position 15, thus the simulated click action performed on the fifth position 15 also enables the launch of the application G.

At block 207, displaying, by the electronic device, an interface after the simulated click action in or with an initial display region. The initial display region is a region occupied by the first display content before the zoom-out process.

For example, after the simulated click action is performed, the electronic device may display the interface after the simulated click action with the initial display region. The initial display region may be the region occupied by the first display content before the zoom-out process.

Figure 9:
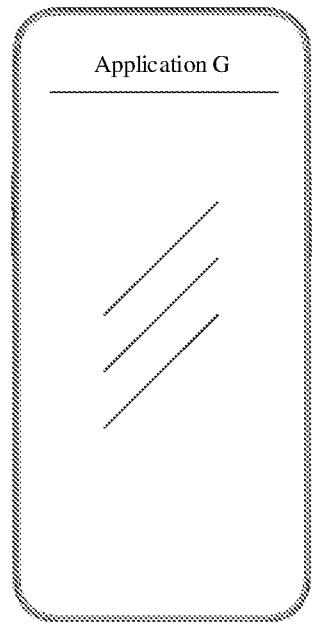
FIG. 9 is a schematic diagram illustrating the another scenario of the device control method according to some embodiments of the present disclosure.

For example, the electronic device may display the first display content before the zoom-out process with the entire region of the touch display screen. That is, the region occupied by the first display content before the zoom-out process is the region of the full screen. Therefore, the electronic device may display the interface after the simulated click action with the full screen. For example, since the interface displayed after the simulated click action is an interface of the application G, thus, as shown in FIG. 9, after the user's thumb leaves the touch display screen, the electronic device may display the interface of the application G with the full screen.

It should be noted that, to display the interface after the simulated click action with the initial display region means that, the electronic device has quit the single-hand operation mode.

It should be appreciated that, first, the embodiments of the present disclosure provide a brand new way of the single-hand operation, and thus increase the diversity of operating the electronic device with a single hand.

Second, the triggering touch operation corresponding to the trigger instruction and the touch operation received in the target region have a continuous touch trajectory. In this way, the embodiments of the present disclosure may integrate the operations of activating the single-hand operation mode, clicking on the display content, and exiting the single-hand operation mode into a single step operation, thus increasing the convenience of the user's interaction with the electronic device during the single-hand operation.

Further, the user may trigger the operation mode provided by the embodiments of the present disclosure only when the single-hand operation is required. In this way, the electronic device does not need to maintain in a specific single-hand operation mode for a long time. That is, the single-hand operation mode provided by embodiments of the present disclosure has the functional characteristics of timeliness and light-weight.

Finally, with the single-hand operation mode provided by embodiments of the present disclosure, the trigger gesture corresponds to the scaling response of the display content of the touch display screen, such that the user has a sense of control when performing corresponding operations, and the user's experience is better.

In some embodiments of the present disclosure, the operation of displaying the interface after the simulated click action with the initial display region at block 207 may include: in response to the content displayed on the interface being triggered to change by the simulated click action, displaying, by the electronic device, a second display content after the simulated click action with the initial display region.

For example, when the simulated click action triggers the content displayed on the display screen to switch from the current interface to another interface, for example, when the position where the simulated click action is performed is the position of the icon of an application, then the content displayed on the display screen after the simulated click action will switch from the current desktop to a running interface of this application. In this case, the electronic device may display the second display content with the initial display region. The second display content is the interface after the simulated click action.

When the simulated click action does not trigger the content displayed on the display screen to switch from the current interface to another interface, for example, when the position where the simulated click action is performed is a blank position, and there is no clickable buttons, links, or other controls at this blank position, then the content displayed on the display screen will not change after the simulated click action (i.e., the electronic device does not provide any response to the simulated click action). For example, the content displayed on the display screen is still the desktop after the simulated click action. Therefore, the electronic device may not display the interface after the simulated click action with the initial display region.

It should be noted that, when the simulated click action does not trigger the content displayed on the display screen to switch from the current interface to another interface, then it may be possible that, the user's touch operation fails to touch the desired touch position. In this case, instead of immediately exiting the single-hand operation mode, the electronic device may continue to display the zoom-out first display content in the target region, thereby facilitating the user to re-perform the single-hand operation. When a new simulated click action triggers the content displayed on the display screen to change, the interface after the simulated click action will be displayed with the initial display region.

In some embodiments of the present disclosure, the location and size of the target region may be customized by the user in advance. For example, the location and the size of the target region when it is needed to operate the electronic device with the single left hand may be preset by the user according to the size of the palm, the lengths of the fingers or the like. The location and the size of the target region when it is needed to operate the electronic device with the single right hand may be preset by the user according to the size of the palm, the lengths of the fingers or the like. Therefore, the single-hand operation of the electronic device by the user is facilitated.

In some embodiments, the electronic device may learn, by a way of guiding the user to perform some preset operations, the region accessible to the fingers when the user operates the electronic device with one single hand. The size, location or the like of the target region may be determined according to the learned region accessible to the fingers during the single-hand operation of the user.

In some other embodiments, the trigger instruction configured to trigger the electronic device to enter the single-hand operation mode may also be, for example, a voice control instruction. For example, when a predetermined voice control instruction configured to indicate the electronic device to enter the single-hand operation mode is received, the electronic device may perform the zoom-out process on the first display content on the touch display screen, and display the first display content subject to the zoom-out process in the determined target region. When the event of switching from receiving the continuous touch operation to exiting the touch operation in the target region is monitored, the electronic device obtains the first touch position corresponding to the last touch operation before exiting the touch operation. The touch operation corresponding to the trigger instruction and the touch operation received in the target region have a continuous touch trajectory. Next, the electronic device performs the simulated click action on the content displayed at the first touch position corresponding to the last touch operation, and displays the interface after the simulated click action with the initial display region. The initial display region is the region occupied by the first display content before the zoom-out process, or the like.

In some embodiments, after the zoom-out first display content is displayed in the target region, and the event of switching from receiving the continuous touch operation to exiting the touch operation is monitored in the target region, when the electronic device detects that the last touch operation before exiting the touch operation is a long-press operation on an application icon in the first display content (i.e., a press duration is greater than a preset duration length), then the response made by the electronic device may be to call out an operation menu bar or shortcut of this application. That is, when the last touch operation performed by the user is the long-press operation on the application icon in the first display content, the electronic device may respond by calling out the operation menu bar of this application.

As shown in FIGS. 10 to 15, FIGS. 10 to 15 are schematic diagrams of another scenario of the device control method according to some embodiments of the present disclosure.

For example, the user is now operating the electronic device with a single right hand, and the touch display screen of the electronic device displays the desktop. The content displayed on the desktop may be as shown in FIG. 2, and include the icons of the applications A, B, C, D, E, F, G, H, J and the texts corresponding to the names of the applications A, B, C, D, E, F, G, H and J. The user wants to click the icon of the application D on the desktop to launch the application D. Since the screen of the electronic device is a large-sized screen, in the case of displaying in the full screen, when the user operates the electronic device with a single right hand, the right thumb can't reach the icon of the application D.

Figure 10:
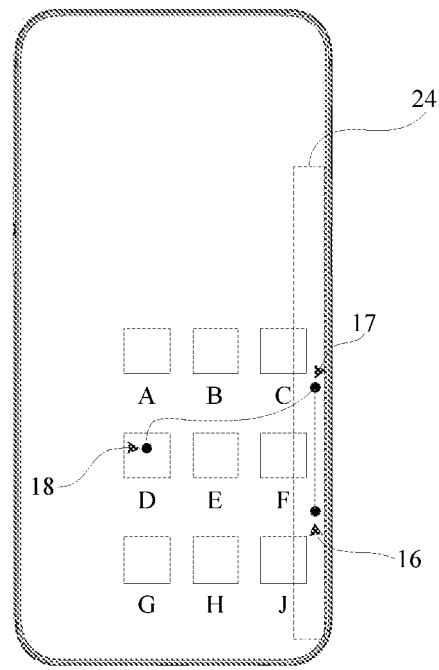
FIG. 10 is a schematic diagram illustrating yet another scenario of the device control method according to some embodiments of the present disclosure.

In some embodiments of the present disclosure, as shown in FIG. 10, the user may perform an upward sliding operation in the right-side display region 24 of the touch display screen. The sliding direction corresponding to the upward sliding operation is upward. The length of the sliding trajectory corresponding to the upward sliding operation is greater than the preset threshold. For example, a start point of the upward sliding operation is a sixth position 16 (see the black dot position indicated by an arrow in the figure) and an end point of the upward sliding operation is a seventh position 17 (see the black dot position indicated by an arrow in the figure). Upon receipt of the upward sliding operation, the electronic device may determine a region with the preset size in the lower-right corner as the target region. For example, the target region may be the region 10 shown in FIG. 3. In addition, the electronic device may perform the zoom-out process on the currently displayed desktop content, and as shown in FIG. 4, display the desktop content subject to the zoom-out process in the target region.

In some embodiments of the present disclosure, the process that the electronic device performs the zoom-out process on the currently displayed desktop content and displays the desktop content subject to the zoom-out process in the target region is a fast and dynamic process. For example, after the upward sliding operation of the user in the right-side display region is received, the desktop content may move toward a right edge of the display screen substantially along a horizontal direction or a traverse direction and may be scaled down or zoomed out during this movement, and the desktop content may move toward a lower edge of the display screen substantially along a vertical direction and may be scaled down or zoomed out during the movement. In this way, the desktop content moves rapidly toward the target region during the zoom-out process until the zoom-out desktop content is wholly and completely located in the target region, and the desktop content may stop zooming out and moving. That is, the desktop content may be gradually zoomed out and quickly moved into the target region. At this time, an area of the image corresponding to the zoom-out desktop content may be substantially equal to an area of the target region, or slightly less than the area of the target region, and so on.

In some embodiments, the electronic device may also first obtain the size of the target region, and directly zoom out the desktop content (i.e., the first display content) to a size that matches the size of the target region, and then move the zoom-out desktop content (i.e., the zoom-out first display content) into the target region.

After performing the upward sliding operation, the user's thumb does not need to leave the touch display screen. After displaying the desktop content subject to the zoom-out process in the target region, the user's thumb may continue to perform the sliding operation in the target region. For example, the user's thumb slides to the icon of the application D, and then the user lifts the thumb. That is, a sliding trajectory of the upward sliding operation performed by the user's thumb in the right-side display region and a sliding trajectory of the sliding operation performed by the user's thumb in the target region are continuous. For example, the entire sliding trajectory of the user's thumb on the display screen may be like the trajectory as shown in FIG. 10, which consists of the sixth position 16, the seventh position 17, and the eighth position 18 (see the black dot positions indicated by the arrows in the figure) in series. After it is detected that the user lifts the thumb, the electronic device may obtain the first touch position corresponding to the last touch operation of the user. That is, the electronic device may obtain the eighth position 18. Next, the electronic device may perform the simulated click action at the eighth position 18. Since the eighth position 18 is the position where the icon of the application D is located, the simulated click action performed by the electronic device at the eighth position 18 will enable the launching of the application D.

Figure 11:
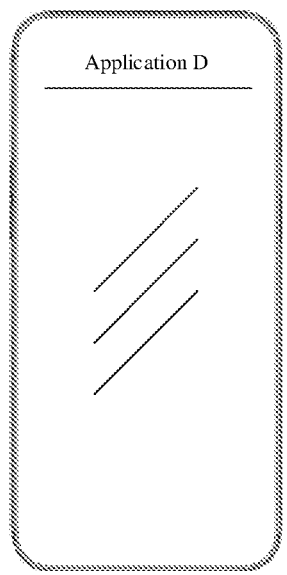
FIG. 11 is a schematic diagram illustrating the yet another scenario of the device control method according to some embodiments of the present disclosure.

After the user lifts the thumb, as shown in FIG. 11, the electronic device may display the interface of the application D in the full screen. That is, the single-hand operation interface is exited at this time.

Figure 12:
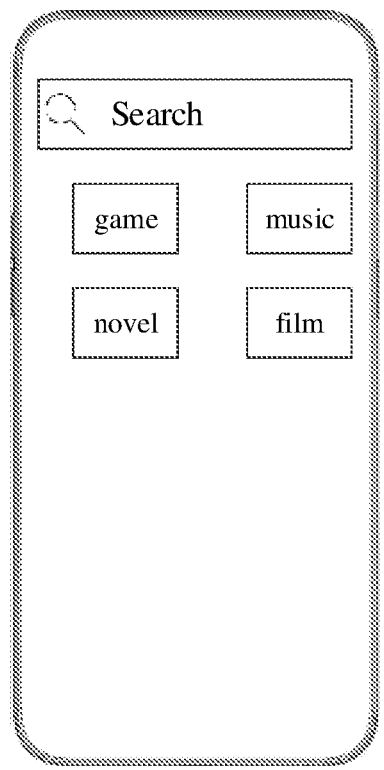
FIG. 12 is a schematic diagram illustrating the yet another scenario of the device control method according to some embodiments of the present disclosure.

For another example, the user is now operating the electronic device with the single left hand, and the interface displayed on the touch display screen of the electronic device may be as shown in FIG. 12. The interface includes a search control (search). The user wants to click the search control on the interface to initiate a search function. Since the screen of the electronic device is a large-sized screen, in the case of displaying in the full screen, when the user operates the electronic device with a single left hand, the left thumb can't reach the search control.

Figure 13:
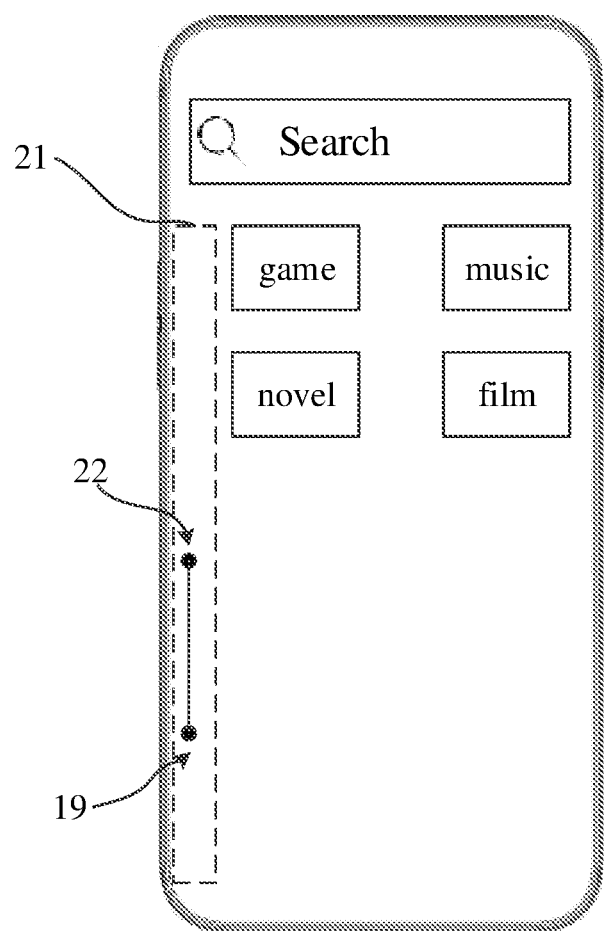
FIG. 13 is a schematic diagram illustrating the yet another scenario of the device control method according to some embodiments of the present disclosure.
Figure 14:
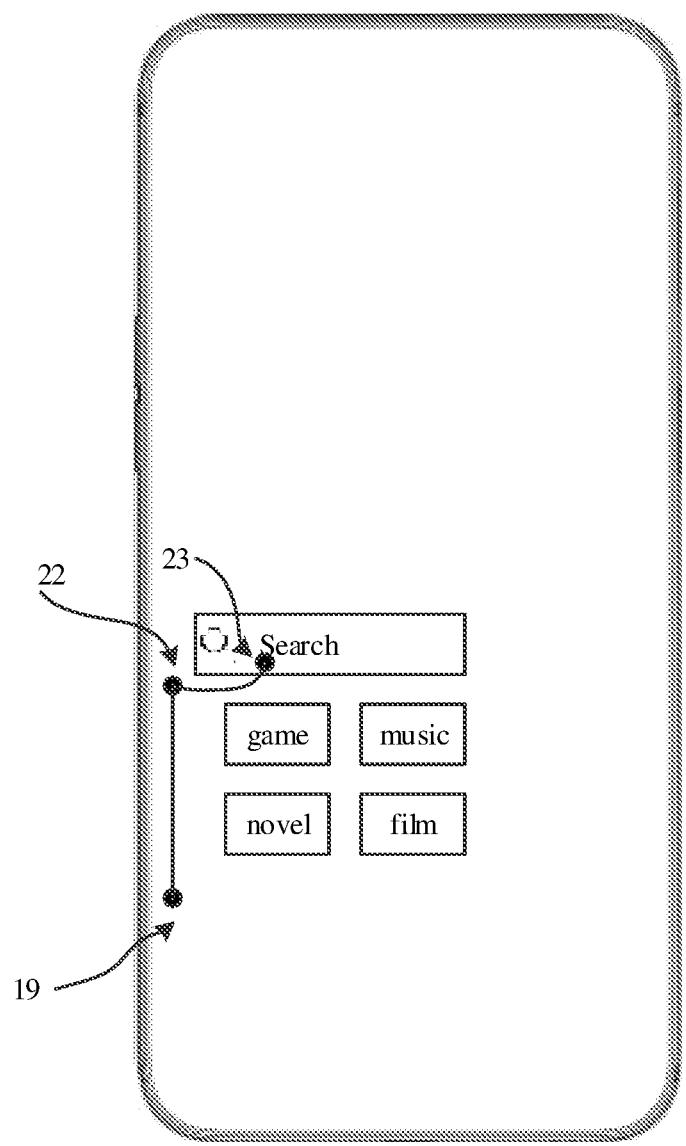
FIG. 14 is a schematic diagram illustrating the yet another scenario of the device control method according to some embodiments of the present disclosure.

In some embodiments of the present disclosure, as shown in FIG. 13, the user may perform an upward sliding operation in the left-side display region 21 of the touch display screen. The sliding direction corresponding to the upward sliding operation is upward. The length of the sliding trajectory corresponding to the upward sliding operation is greater than the preset threshold. For example, a start point of the upward sliding operation is a ninth position 19 (see the black dot position indicated by an arrow in the figure) and an end point of the upward sliding operation is a tenth position 22 (see the black dot position indicated by an arrow in the figure). Upon receipt of the upward sliding operation, the electronic device may determine a region with the preset size in the lower-left corner as the target region. For example, the target region may be the region 20 in FIG. 7. In addition, the electronic device may perform the zoom-out process on the currently displayed desktop content, and as shown in FIG. 14, display the desktop content subject to the zoom-out process in the target region.

In some embodiments of the present disclosure, the process that the electronic device performs the zoom-out process on the currently displayed desktop content and displays the desktop content subject to the zoom-out process in the target region is a fast and dynamic process. For example, after the upward sliding operation of the user in the left-side display region is received, the desktop content may move toward a left edge of the display screen horizontal along the horizontal direction or the transverse direction and may be scaled down or zoomed out during the movement, and the desktop content may move toward the lower edge of the display screen substantially along the vertical direction and zoom-out during the movement. In this way, the desktop content moves rapidly toward the target region during the zoom-out process until the zoom-out desktop content is wholly and completely located in the target region, then the desktop content may stop zooming out and moving. That is, the desktop content may be gradually zoomed out and quickly moved into the target region. At this time, the area of the image corresponding to the zoom-out desktop content may be substantially equal to the area of the target region, or slightly less than the area of the target region.

In some other embodiments, the electronic device may also first obtain the size of the target region, and directly zoom out the desktop content (i.e., the first display content) to a size that matches the size of the target region, and then move the zoom-out desktop content (i.e., the zoom-out first display content) into the target region.

After performing the upward sliding operation, the user's thumb does not need to leave the touch display screen. After displaying the desktop content subject to the zoom-out process in the target region, the user's thumb may continue to perform the sliding operation in the target region. For example, the user's thumb slides to the search control, and then the user lifts the thumb. That is, the sliding trajectory of the upward sliding operation performed by the user's thumb in the left-side display region and the sliding trajectory of the sliding operation performed by the user's thumb in the target region are continuous. For example, the entire sliding trajectory of the user's thumb on the display screen may be like the trajectory as shown in FIG. 14, which consists of the ninth position 19, the tenth position 22, and the eleventh position 23 (see the black dot positions indicated by the arrows in the figure) in series. After it is detected that the user lifts the thumb, the electronic device may obtain the first touch position corresponding to the last touch operation of the user. That is, the electronic device may obtain the eleventh position 23. Next, the electronic device may perform the simulated click action at the eleventh position 23. Since the eleventh position 23 is the position where the search control is located, the simulated click action performed by the electronic device at the eleventh position 23 will initiate the search function.

Figure 15:
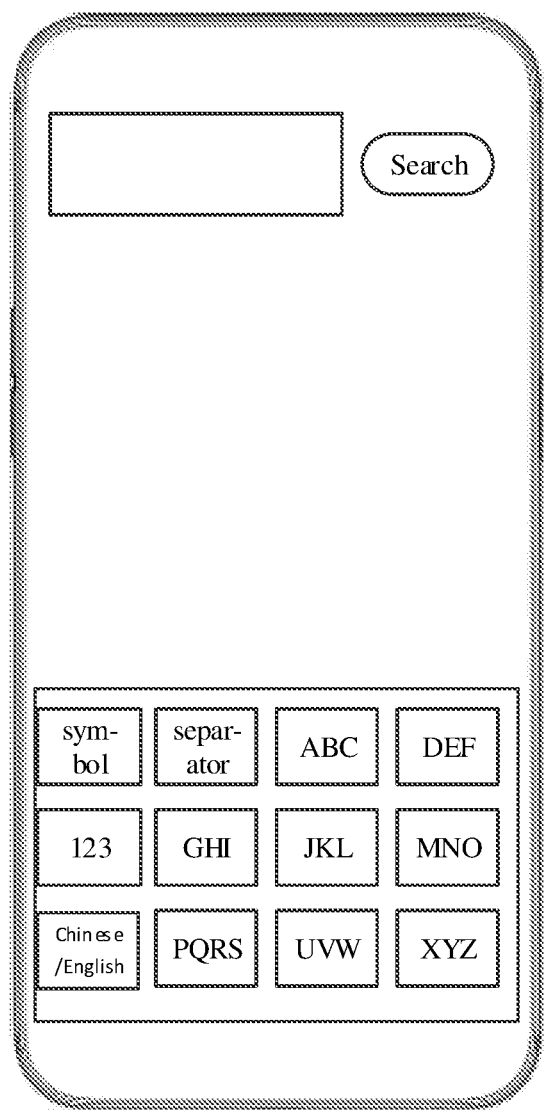
FIG. 15 is a schematic diagram illustrating the yet another scenario of the device control method according to some embodiments of the present disclosure.

After the user lifts the thumb, as shown in FIG. 15, the electronic device may display the interface of the search function in the full screen. That is, the single-hand operation interface is exited at this time.

Figure 16:
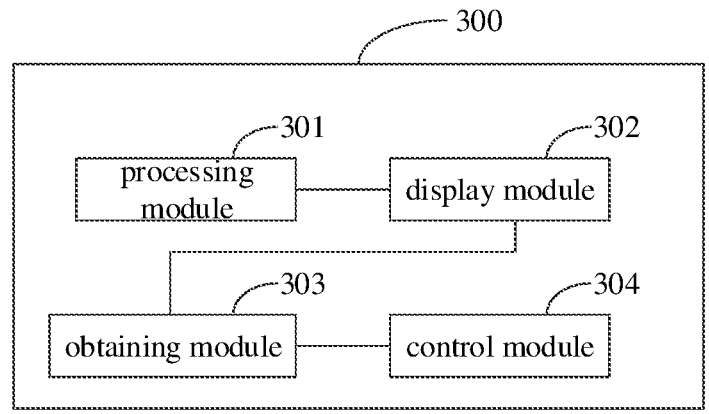
FIG. 16 is a schematic structural diagram of a device control apparatus according to some embodiments of the present disclosure.

As shown in FIG. 16, FIG. 16 is a schematic structural diagram of a device control apparatus according to some embodiments of the present disclosure. The device control apparatus may be applied to an electronic device. The electronic device includes a touch display screen. The device control apparatus 300 may include a processing module 301, a display module 302, an obtaining module 303, and a control module 304.

The processing module 301 is configured to perform the zoom-out process on the first display content on the touch display screen.

The display module 302 is configured to determine the target region on the touch display screen, and display the first display content subject to the zoom-out process in the target region. The target region is a region that is accessible in the single-hand operation mode.

The obtaining module 303 is configured to obtain, in response to monitoring the event of switching from receiving the continuous touch operation to exiting the touch operation in the target region, the first touch position corresponding to the last touch operation before exiting the touch operation. The continuous touch operation is a touch operation having a continuous touch trajectory.

The control module 304 is configured to perform the simulated click action on the content displayed at the first touch position corresponding to the last touch operation.

In some embodiments of the present disclosure, the control module 304 may be further configured to display an interface after the simulated click action with an initial display region. The initial display region is a region occupied by the first display content before the zoom-out process.

In some embodiments of the present disclosure, the control module 304 may be configured to display, in response to the content displayed on the interface being triggered to change by the simulated click action, a second display content after the simulated click action with the initial display region.

In some embodiments of the present disclosure, the processing module 301 may be further configured to: receive the trigger instruction; and in response to the received trigger instruction meeting the preset condition, perform the zoom-out process on the first display content on the touch display screen.

In some embodiments of the present disclosure, the processing module 301 may be configured to: receive the triggering touch operation through the touch display screen. In this case, the received trigger instruction meeting the preset condition may include: the touch parameter corresponding to the triggering touch operation received by the touch display screen meeting the preset condition.

In some embodiments of the present disclosure, the touch parameter corresponding to the triggering touch operation received by the touch display screen meeting the preset condition may include: a second touch position corresponding to the triggering touch operation received by the touch display screen being located in the side display region of the touch display screen, and the corresponding touch direction being the preset direction.

In some embodiments of the present disclosure, the touch parameter corresponding to the triggering touch operation received by the touch display screen meeting the preset condition may include: the second touch position corresponding to the triggering touch operation received by the touch display screen being located in the side display region of the touch display screen, the corresponding touch direction being the preset direction, and the length of the corresponding touch trajectory reaching the preset threshold.

In some embodiments of the present disclosure, the display module 302 may be configured to: in response to receiving, by the right-side display region of the touch display screen, the triggering touch operation meeting the preset condition, determine the region with a preset size at the lower-right side of the touch display screen as the target region; and in response to receiving, by the left-side display region of the touch display screen, the triggering touch operation meeting the preset condition, determine the region with the preset size at the lower-left side of the touch display screen as the target region.

In some embodiments of the present disclosure, the triggering touch operation corresponding to the trigger instruction and the touch operation received in the target region have a continuous touch trajectory.

Some embodiments of the present disclosure provide a computer-readable storage medium having a computer program stored thereon. When being executed on a computer, the computer program may enable the computer to perform the operations of the device control method provided in some embodiments of the present disclosure.

Some embodiments of the present disclosure further provide an electronic device including a memory and a processor. The processor is configured to perform, by calling the computer program stored in the memory, the operations in the device control method provided in some embodiments of the present disclosure.

Figure 17:
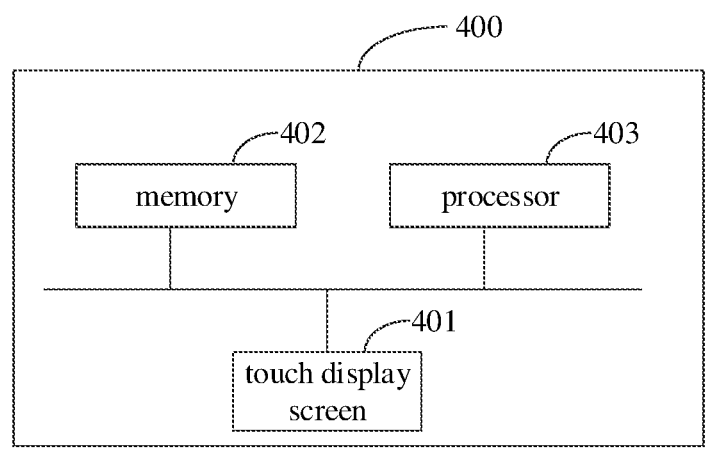
FIG. 17 is a schematic structural diagram of an electronic device according to some embodiments of the present disclosure.

For example, the above-mentioned electronic device may be a mobile terminal such as a tablet computer or a smartphone. As shown in FIG. 17, FIG. 17 is a schematic structural diagram of an electronic device according to some embodiments of the present disclosure.

The electronic device 400 may include components such as a touch display screen 401, a memory 402, a processor 403, and the like. It should be appreciated by those skilled in the art that, the structure of the electronic device illustrated in FIG. 17 does not constitute a limitation to the electronic device. The electronic device may include more or fewer components than the components illustrated, or may include a combination of some components, or may have a different arrangement of components.

The touch display screen 401 may be configured to display information such as texts, images, or the like. The touch display screen 401 may also be configured to receive touch operations from the user.

The memory 402 may be configured to store application programs and data. The application programs stored in the memory 402 may include executable codes. The application programs may constitute various functional modules. The processor 403 performs various functional applications as well as data processing by running the application programs stored in the memory 402.

The processor 403 is a control center of the electronic device. The processor 403 is connected to various parts of the entire electronic device by various interfaces and wires. The processor 403 performs various functions of the electronic device and processes data by running or executing application programs stored in the memory 402 and by calling data stored in the memory 402, thereby monitoring the electronic device as a whole.

In some embodiments, the processor 403 in the electronic device may load the executable codes corresponding to the routines of one or more application programs into the memory 402 in accordance with the following instructions, and the processor 403 may run the application programs stored in the memory 402 and execute the following operations: performing the zoom-out process on the first display content on the touch display screen; determining the target region on the touch display screen, and displaying, in the target region, the first display content subject to the zoom-out process, the target region being a region that is accessible in the single-hand operation mode; obtaining, in response to monitoring the event of switching from receiving the continuous touch operation to exiting the touch operation in the target region, the first touch position corresponding to the last touch operation before exiting the touch operation, the continuous touch operation being a touch operation having a continuous touch trajectory; and performing the simulated click action on the content displayed at the first touch position corresponding to the last touch operation.

Figure 18:
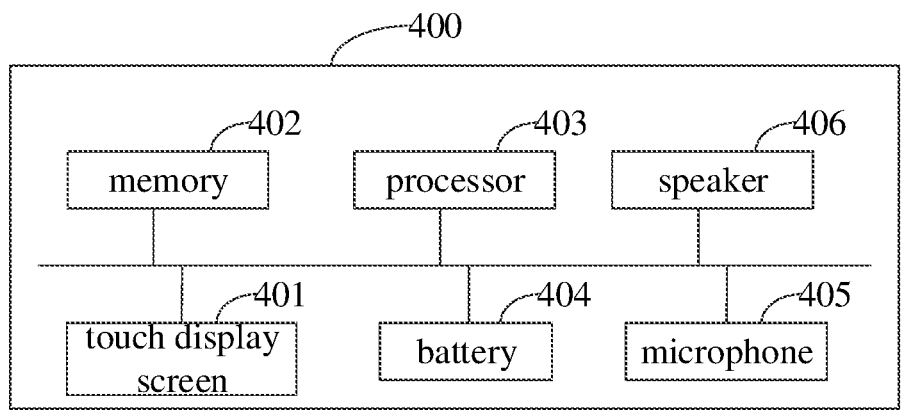
FIG. 18 is another schematic structural diagram of the electronic device according to some embodiments of the present disclosure.

As shown in FIG. 18, the electronic device 400 may include components such as the touch display screen 401, the memory 402, the processor 403, a battery 404, a microphone 405, a speaker 406, and the like.

The touch display screen 401 may be configured to display information such as texts, images, etc. The touch display screen 401 may also be configured to receive touch operations from the user.

The memory 402 may be configured to store application programs and data. The application programs stored in the memory 402 may include executable codes. The application programs may constitute various functional modules. The processor 403 performs various functional applications as well as data processing by running the application programs stored in the memory 402.

The processor 403 is the control center of the electronic device. The processor 403 is connected to various parts of the entire electronic device by various interfaces and wires. The processor 403 performs various functions of the electronic device and processes data by running or executing application programs stored in the memory 402 and by calling data stored in the memory 402, thereby monitoring the electronic device as a whole.

The battery 404 may be configured to provide electrical support for various components of the electronic device, thereby ensuring normal operation of each component.

The microphone 405 may be configured to receive sound signals from the surrounding environment. For example, the microphone 405 may be configured to receive voice from the user.

The speaker 406 may be configured to play sound signals.

In some embodiments, the processor 403 in the electronic device may load the executable codes corresponding to the routines of one or more application programs into the memory 402 in accordance with the following instructions, and the processor 403 may run the application programs stored in the memory 402 and execute the following operations: performing the zoom-out process on the first display content on the touch display screen; determining the target region on the touch display screen, and displaying, in the target region, the first display content subject to the zoom-out process, the target region being a region that is accessible in the single-hand operation mode; obtaining, in response to monitoring the event of switching from receiving the continuous touch operation to exiting the touch operation in the target region, the first touch position corresponding to the last touch operation before exiting the touch operation, the continuous touch operation being a touch operation having a continuous touch trajectory; and performing the simulated click action on the content displayed at the first touch position corresponding to the last touch operation.

In some embodiments of the present disclosure, the processor 403 may be further configured to perform the operation of displaying the interface after the simulated click action with the initial display region. The initial display region is the region occupied by the first display content before the zoom-out process.

In some embodiments of the present disclosure, when performing the operation of displaying the interface after the simulated click action with the initial display region, the processor 403 may be configured to perform the operation of: displaying, in response to the content displayed on the interface being triggered to change by the simulated click action, the second display content after the simulated click action with the initial display region.

In some embodiments of the present disclosure, the processor 403 may further be configured to perform the operation of receiving the trigger instruction.

In this case, when performing the operation of performing the zoom-out process on the first display content on the touch display screen, the processor 403 may be configured to perform the operation of: performing, in response to the received trigger instruction meeting the preset condition, the zoom-out process on the first display content on the touch display screen.

In some embodiments of the present disclosure, when performing the operation of receiving the trigger instruction, the processor 403 may be configured to perform the operation of: receiving the triggering touch operation through the touch display screen.

In this case, the received trigger instruction meeting the preset condition may include: the touch parameter corresponding to the triggering touch operation received by the touch display screen meeting the preset condition.

In some embodiments of the present disclosure, the touch parameter corresponding to the triggering touch operation received by the touch display screen meeting the preset condition may include: the second touch position corresponding to the triggering touch operation received by the touch display screen being located in the side display region of the touch display screen, and the corresponding touch direction being the preset direction.

In some embodiments of the present disclosure, the touch parameter corresponding to the triggering touch operation received by the touch display screen meeting the preset condition may include: the second touch position corresponding to the triggering touch operation received by the touch display screen being located in the side display region of the touch display screen, the corresponding touch direction being the preset direction, and the length of the corresponding touch trajectory reaching the preset threshold.

In some embodiments of the present disclosure, when performing the operation of determining the target region on the touch display screen, the processor 403 may be configured to perform the operations of: in response to receiving, by the right-side display region of the touch display screen, the triggering touch operation meeting the preset condition, determining the region with a preset size at the lower-right side of the touch display screen as the target region; and in response to receiving, by the left-side display region of the touch display screen, the triggering touch operation meeting the preset condition, determining the region with the preset size at the lower-left side of the touch display screen as the target region.

In some embodiments of the present disclosure, the triggering touch operation corresponding to the trigger instruction and the touch operation received in the target region have a continuous touch trajectory.

In the above embodiments, the description of each embodiment has its own focus, and one part that is not described in detail in some embodiments may be found in the detailed description of the device control method above, which will not be repeated here.

The device control apparatus provided in some embodiments of the present disclosure belongs to a same idea as the device control method in the above embodiments. Any method provided in the embodiment of the device control method may be run on the device control apparatus, the specific implementation process of which is detailed in the embodiments of the device control method, and will not be repeated here.

It should be noted that, for the device control method described in the embodiments of the present disclosure, those skilled in the art will appreciate that, all the process or a part of the process for implementing the device control method described in the embodiments of the present disclosure may be accomplished by controlling relevant hardware with a computer program. The computer program may be stored in a computer-readable storage medium, such as in a memory, and may be executed by at least one processor. When being executed, the computer program may include the process as in the embodiments of the device control method. The storage medium may be a disk, an optical disk, a read only memory (ROM), a random access memory (RAM), or the like.

For the device control apparatus described in the embodiments of the present disclosure, each of its functional modules may be integrated in a processing chip, or each module may be physically separated, or two or more modules may be integrated into one single module. The integrated module may be implemented either in the form of hardware or software functional module. The integrated module, when implemented as a software function module and sold or used as a stand-alone product, may also be stored in a computer-readable storage medium. The storage medium may for example be a read-only memory, a disk, an optical disk or the like.

The device control method, the apparatus, the storage medium, and the electronic device provided according to some embodiments of the present disclosure are detailed above. The principle and implementation of the present disclosure are illustrated in the present disclosure by means of specific embodiments. The illustration of the above embodiments is only for facilitating the understanding of the method and its core idea in the present disclosure. Meanwhile, according to the idea of the present disclosure, specific implementation and its application scope may be changed by those skilled in the art. In summary, the contents of the specification should not be construed as a limitation to the present disclosure.

What is claimed is:

1. A device control method, applied to an electronic device comprising a touch display screen, the method comprising:
    performing a zoom-out process on a first display content on the touch display screen;
    determining a target region on the touch display screen;
    displaying, in the target region, the first display content subject to the zoom-out process, the target region being a region that is accessible in a single-hand operation mode;
    obtaining, in response to monitoring an event of switching from receiving a continuous touch operation to exiting the touch operation in the target region, a first touch position of the last touch operation before exiting the touch operation, the continuous touch operation being a touch operation having a continuous touch trajectory; and
    performing a simulated click action on a content displayed at the first touch position of the last touch operation,
    wherein the touch trajectory starts from a start point of a triggering touch operation configured to trigger the zoom-out process to the first touch position of the last touch operation and is continuous and uninterrupted;
    wherein the method further comprises:
    displaying, in response to a content displayed on an interface being triggered to change by the simulated click action, a second display content after the simulated click action with an initial display region, wherein the initial display region is a region occupied by the first display content before the zoom-out process; and
    displaying, in response to not triggering a content displayed on an interface to change by the simulated click action, the first display content which is subjected to the zoom-out process in the target region continuously.

2. The device control method as claimed in claim 1, further comprising:
    receiving a trigger instruction;
    wherein the performing the zoom-out process on the first display content on the touch display screen comprises:
    performing, in response to the received trigger instruction meeting a preset condition, the zoom-out process on the first display content on the touch display screen.

3. The device control method as claimed in claim 2, wherein
    the receiving the trigger instruction comprises:
        receiving the triggering touch operation through the touch display screen;
    the received trigger instruction meeting the preset condition comprises:
        a touch parameter corresponding to the triggering touch operation received by the touch display screen meeting the preset condition.

4. The device control method as claimed in claim 3, wherein
    the touch parameter corresponding to the triggering touch operation received by the touch display screen meeting the preset condition comprises:
        a second touch position corresponding to the triggering touch operation received by the touch display screen being located in a side display region of the touch display screen, a corresponding touch direction being a preset direction, and a length of a corresponding touch trajectory reaching a preset threshold, wherein the preset threshold is greater than 0.

5. The device control method as claimed in claim 4, wherein
    the triggering touch operation corresponding to the trigger instruction and the touch operation received in the target region have a continuous touch trajectory.

6. The device control method as claimed in claim 3, wherein
    the touch parameter corresponding to the triggering touch operation received by the touch display screen meeting the preset condition comprises:
        a second touch position corresponding to the triggering touch operation received by the touch display screen being located in a side display region of the touch display screen, and a corresponding touch direction being a preset direction.

7. The device control method as claimed in claim 2, wherein
    the determining the target region on the touch display screen comprises:
        determining a region with a preset size at a lower-right side of the touch display screen as the target region, in response to receiving, by a right-side display region of the touch display screen, a triggering touch operation meeting the preset condition; and
        determining a region with the preset size at a lower-left side of the touch display screen as the target region, in response to receiving, by a left-side display region of the touch display screen, the triggering touch operation meeting the preset condition.

8. The device control method as claimed in claim 1, further comprising:
    displaying an interface after the simulated click action with an initial display region, wherein the initial display region is a region occupied by the first display content before the zoom-out process.

9. The device control method as claimed in claim 1, wherein
    the continuous touch operation consists of the triggering touch operation and the touch operation received in the target region, and both the triggering touch operation and the touch operation received in the target region are located in the target region.

10. The device control method as claimed in claim 1, wherein
    calling out a shortcut of an application, in response to detecting that the last touch operation is an operation, which has a press duration is greater than a preset duration length, on an application icon of the application.

11. The device control method as claimed in claim 1, wherein the initial display region is a full screen of the electronic device.

12. An electronic device comprising a memory, a processor, and a touch display screen, wherein the processor is configured to call a computer program stored in the memory to perform operations of:

performing a zoom-out process on a first display content on the touch display screen;

determining a target region on the touch display screen, and displaying, in the target region, the first display content subject to the zoom-out process, the target region being a region that is accessible in a single-hand operation mode;

obtaining, in response to monitoring an event of switching from receiving a continuous touch operation to exiting the touch operation in the target region, a first touch position of the last touch operation before exiting the touch operation, the continuous touch operation being a touch operation having a continuous touch trajectory; and performing a simulated click action on a content displayed at the first touch position of the last touch operation, wherein the touch trajectory starts from a start point of a triggering touch operation configured to trigger the zoom-out process to the first touch position of the last touch operation and is continuous and uninterrupted;

wherein the method further comprises:

displaying, in response to a content displayed on an interface being triggered to change by the simulated click action, a second display content after the simulated click action with an initial display region, wherein the initial display region is a region occupied by the first display content before the zoom-out process; and displaying, in response to not triggering a content displayed on an interface to change by the simulated click action, the first display content which is subjected to the zoom-out process in the target region continuously.

13. The electronic device as claimed in claim 12, wherein the processor is further configured to perform operations of:

receiving a trigger instruction, performing, in response to the received trigger instruction meeting a preset condition, the zoom-out process on the first display content on the touch display screen.

14. The electronic device as claimed in claim 13, wherein the processor is further configured to perform operations of:

receiving the triggering touch operation through the touch display screen; and performing, in response to a touch parameter corresponding to the triggering touch operation received by the touch display screen meeting the preset condition, the zoom-out process on the first display content on the touch display screen.

15. The electronic device as claimed in claim 14, wherein the processor is further configured to perform an operation of:

performing, in response to a second touch position corresponding to the triggering touch operation received by the touch display screen being located in a side display region of the touch display screen, a corresponding touch direction being a preset direction, and a length of a corresponding touch trajectory reaching a preset threshold, the zoom-out process on the first display content on the touch display screen, wherein the preset threshold is greater than 0.

16. The electronic device as claimed in claim 15, wherein the triggering touch operation corresponding to the trigger instruction and the touch operation received in the target region have a continuous touch trajectory.

17. The electronic device as claimed in claim 14, wherein the processor is further configured to perform an operation of:

performing, in response to a second touch position corresponding to the triggering touch operation received by the touch display screen being located in a side display region of the touch display screen and a corresponding touch direction being a preset direction, the zoom-out process on the first display content on the touch display screen.

18. The electronic device as claimed in claim 13, wherein the processor is further configured to perform operations of:

determining a region with a preset size at a lower-right side of the touch display screen as the target region, in response to receiving, by a right-side display region of the touch display screen, a triggering touch operation meeting the preset condition; and determining a region with a preset size at a lower-left side of the touch display screen as the target region, in response to receiving, by a left-side display region of the touch display screen, the triggering touch operation meeting the preset condition.

19. The electronic device as claimed in claim 12, wherein the processor is further configured to perform an operation of:

displaying an interface after the simulated click action with an initial display region, the initial display region is a region occupied by the first display content before the zoom-out process.

20. A non-transitory computer-readable storage medium storing a computer program, wherein when the computer program is executed on a computer, the computer is enabled to perform a device control method applied to an electronic device comprising a touch display screen, and the method comprises:

performing a zoom-out process on a first display content on the touch display screen;

determining a target region on the touch display screen;

displaying, in the target region, the first display content subject to the zoom-out process, the target region being a region that is accessible in a single-hand operation mode;

obtaining, in response to monitoring an event of switching from receiving a continuous touch operation to exiting the touch operation in the target region, a first touch position of the last touch operation before exiting the touch operation, the continuous touch operation being a touch operation having a continuous touch trajectory; and performing a simulated click action on a content displayed at the first touch position of the last touch operation, wherein the touch trajectory starts from a start point of a triggering touch operation configured to trigger the zoom-out process to the first touch position of the last touch operation and is continuous and uninterrupted;

wherein the method further comprises:

displaying, in response to a content displayed on an interface being triggered to change by the simulated click action, a second display content after the simulated click action with an initial display region, wherein the initial display region is a region occupied by the first display content before the zoom-out process; and displaying, in response to not triggering a content displayed on an interface to change by the simulated click action, the first display content which is subjected to the zoom-out process in the target region continuously.

* * * * *